July 27, 1926.
J. WEST
EARTH HANDLING EQUIPMENT
Filed July 20, 1923 2 Sheets-Sheet 1
1,593,996
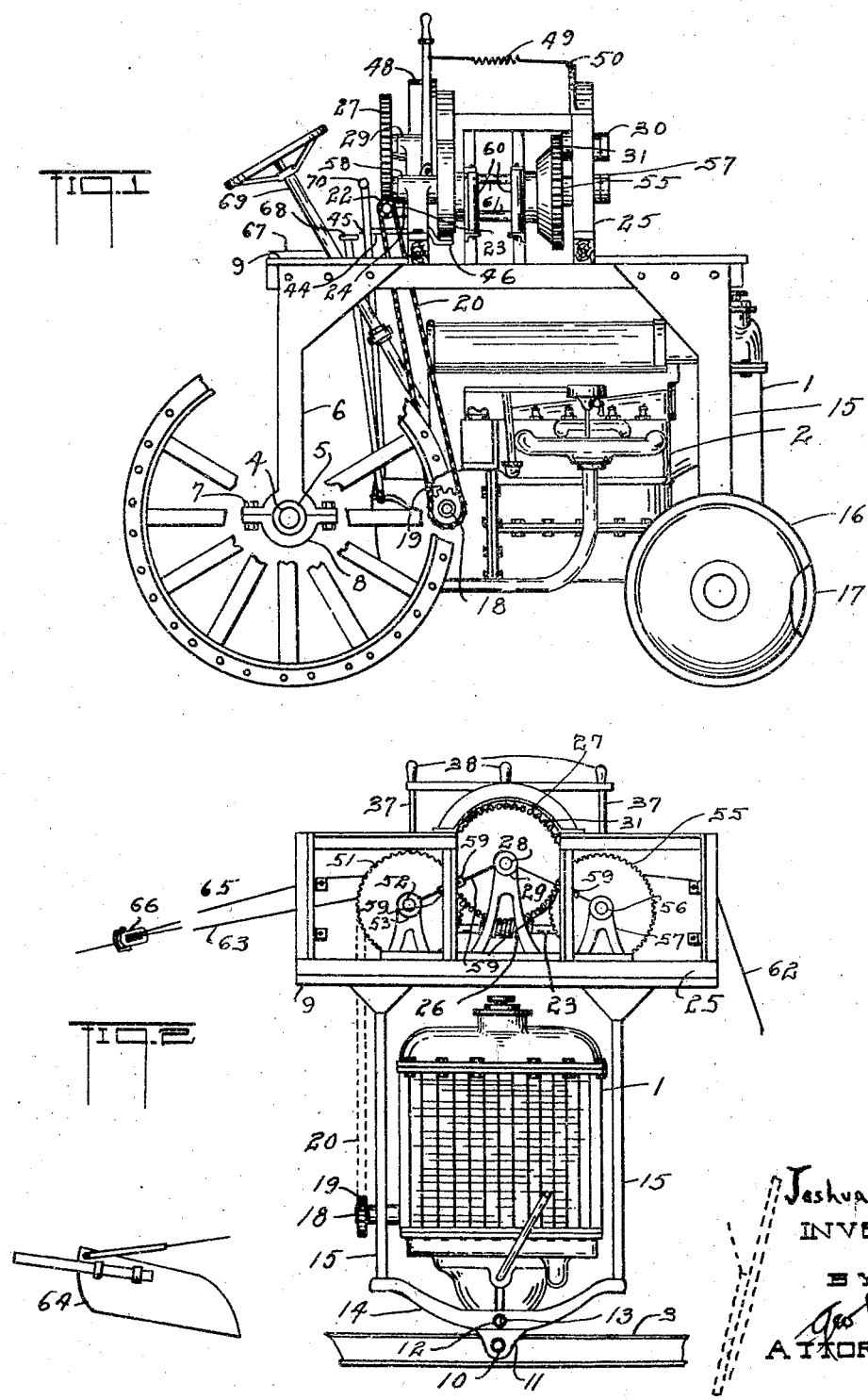

July 27, 1926.
J. WEST
1,593,996
EARTH HANDLING EQUIPMENT
Filed July 20, 1923
2 Sheets-Sheet 2
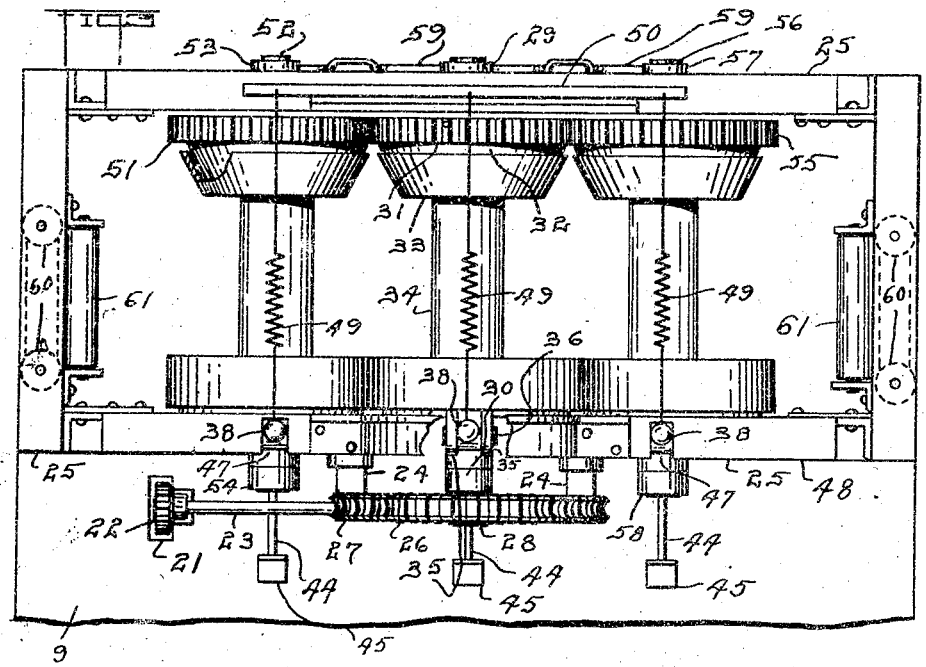
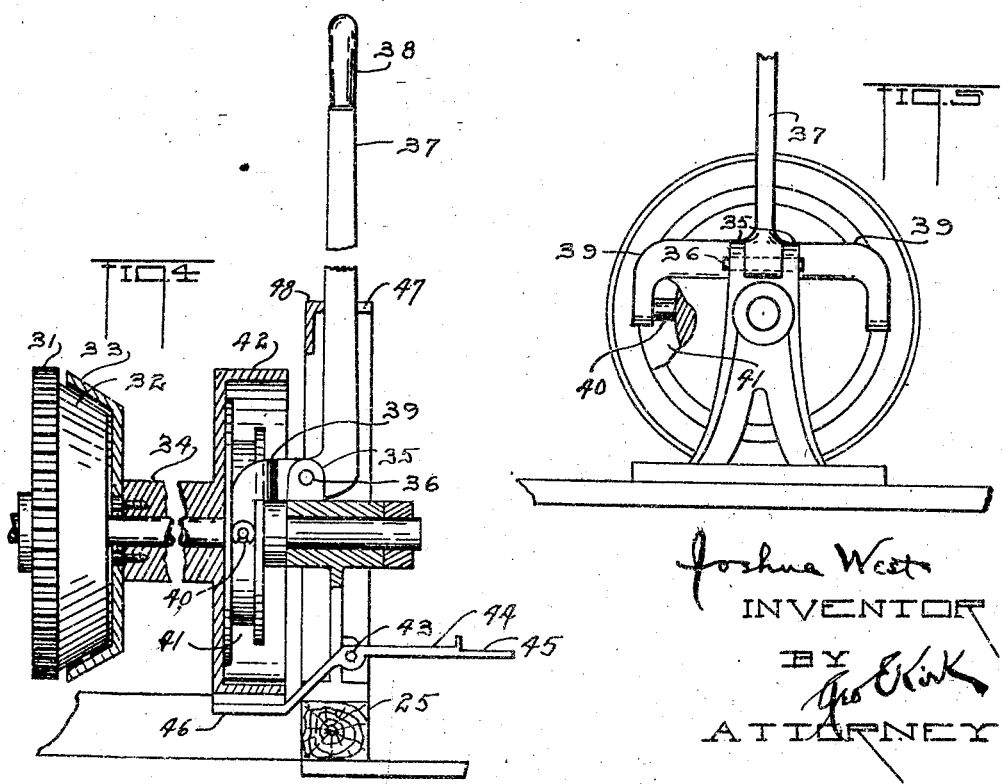
Joshua West
INVENTOR
BY
ATTORNEY Patented July 27, 1926.

1,593,996

UNITED STATES PATENT OFFICE.

JOSHUA WEST, OF IDA, MICHIGAN.

EARTH-HANDLING EQUIPMENT.

Application filed July 20, 1923. Serial No. 652,739.

This invention relates to grading or excavating apparatus.

This invention has utility as a plurality of power actuated drag lines, and the mounting and manipulation thereof.

Referring to the drawings:—

Fig. 1 is a side elevation of an embodiment of the invention mounted upon a structure;

Fig. 2 is a front elevation, with parts broken away, of the device of Fig. 1;

Fig. 3 is a plan view with parts broken away;

Fig. 4 is a detail view of a drum; and

Fig. 5 is a fragmentary end view of the drum of Fig. 4.

Tractor 1 is shown as having motor 2, front axle 3 and rear axle 4. This rear axle 4 has housing 5 upon which rest uprights 6 fixed in position as to the housing 5 by bolts 7 engaging lower clamping sections 8. These uprights 6 extend to deck or platform 9. The front axle 3 above trunnion pin 10 in member 11 has bolt 12 through opening 13 above this trunnion pin 10. This bolt 12 rockably mounts transom bar 14 over the axle 3. This rockable front transom member 14 has from its upwardly offset termini risers 15 to deck or platform 9. Accordingly, the two supports 6 and the bolt 12 provide three-point support or bearing for the platform 9, thereby allowing the tractor in its travel to have a wheel 16 or 17 rise or fall without wrenching or cramping this deck 9.

To be driven by the motor 2 of the tractor is power shaft 18 carrying sprocket wheel 19 from which upwardly extends sprocket chain 20 through an opening 21 in the platform 9 to sprocket wheel 22 on cross shaft 23 mounted in bearings 24 of frame 25 mounted on the deck 9. This shaft 23 has worm 26 in mesh with worm wheel 27 fixedly mounted on shaft 28 in bearings 29, 30, carried by the frame 25.

Between the bearings 29 and 30 this shaft 28 has pinion 31 and clutch member 32 fast therewith. This clutch member 32 is in opposing relation to clutch member 33 fixed with drum 34 loosely mounted on this shaft 28. From the bearing 30 rise ears 35 carrying fulcrum pin 36 for lever 37 having handle 38 at one extremity and at the other extremity having forked portion 39 carrying rollers 40 riding in groove 41 housed by flange 42 of the drum 34. The bearing 30 below the shaft 28 has a second fulcrum pin 43 for lever 44 having treadle portion 45 at an operator's station below the handle 38. The opposite end of this lever 43 has brake shoe portion 46 effective on depression of the treadle 45 to be thrown into frictional retarding relation with the flange or brake drum 42 of the windlass or cable carrying drum 34. The lever 37 is normally thrown into notch 47 of cross bar 48 carried by the frame 25. This drawing or tilting of the lever 37 is effected against the action of tension spring 49 extending across the windlass structure from the lever 37 to bar 50 of the frame 25.

The pinion 31 is in mesh with pinion 51 on shaft 52 in bearings 53, 54, carried by the frame 25. These bearings 53, 54, dispose the shaft 52 on a lower plane than is the shaft 28. Oppositely from this gear 51 the gear 31 is in mesh with gear 55 on shaft 56 mounted in bearings 57, 58, carried by the frame 25. These shafts 52, 56, are in a common plane below the level of the shaft 28. Each of these shafts 52, 56, has clutch and drum construction together with controls therefor in the way of clutch levers 37 and foot brake levers 44. Between the bearings 29, 53, is the turn buckle tie structure 59. There is also such brace or tie between the bearing 29 and the bearing 57 as well as between the bearing 30 and the bearing 54, and the bearing 30 and the bearing 58. This means, that notwithstanding these are separate bearings as mounted upon the common frame 25, there is an additional adjustable aligning means for maintaining the several drums of this multi-drum power driven windlass in rigid assembled relation.

The frame 25 at its opposite ends, which are adjacent the sides of the platform 9, has frame portions providing bearings for vertical guide rollers 60 and horizontal guide rollers 61. These guide rollers are assembled as opposite pairs to form an anti-friction guide throat, through which cable 62 from drum 34 on the shaft 56 may extend. In the opposite direction drum 34 on the shaft 52 may have its cable 63 extend through the other guide throat.

In simple direct operation this machine has great advantage in berming. There is considerable work of this character in rural paving operations wherein loose material is brought up to the level of the concrete or brick highway after such highway is installed. In the drawing of this material directly up to the curb of the pavement, the cables 62, 63, may be connected to slip scrapers 64 of the hand directed type. At operator's station on the platform 9 the respective clutch levers 37 may be drawn into driving position against the action of the springs 49 to effect a drawing or pulling acting upon the drag lines in pulling scrapers full of loose earth up to the vicinity of the pavement. At once upon release of the hand lever 37, the pulling operation ceases. The foot brake 45 may be used to steady the pull or stop feed draft. At once the draft is stopped, the workman directing the filling and dumping of the drag line scoop or scraper 64 may pull such scraper down into the ditch or away from the pavement to be in readiness for a succeeding scraping operation.

In many instances of this road work, there is lack of uniformity in the distribution of the material for proper berming of the pavement. This would mean an inequality in the delivering of the material along the roadside. In practice, this vehicle with its power may be shifted along the highway for drawing in the material and in those instances where there is inequality of distribution the drum 34 on the shaft 28 may have its cable 65 extend through one or the other of the guide throats as may be desired for pulling in the material from a region forward or rearward of the apparatus. This draft has in practive been effective for as much as seventy-five or one hundred feet away from the machine in road work operations. In more extended draft as for instance in ditching work, the cable 65 may extend past the scrapers 64 to a dead man or pulley 66 and thence back by another reach to the drum 34 on the shaft 28 with a scraper 64 on such other reach, thereby permitting power return as well as power pulling up to the load.

This machine is one of considerable compactness and which has a large field for economical operation, especially in connection with extensive ditching, drainage and road work wherein rapid progress may be made along a line of work with the flexibility of permitting operations in both directions toward the structure, and a balance due to intermediate drum operable to take care of inequalities for maximum progress of the machine along the work to be handled. In the close work, as out of a gutter of some depth adjacent a roadway, the height of the structure over the road in its mounting as hereinabove a tractor makes the component of the work as resisting the pull of the draft more effective for handling greater load sizes.

In those operations where mud and dirt works around very freely with the cables or drag lines deleterious effects therefrom are not present, for the bearings are not exposed to have the grit work thereinto for wearing out the structure.

Operator's station 67 on the platform 9 is in position not only for controlling the multiple drum windlass structure, but in the intermittent progress of this power unit, the same operator may, through extension clutch control treadle 68, steering wheel extension 69 and gear shift lever 70 effect driving of this tractor 1 as well as connect the tractor up for driving this windlass structure.

What is claimed and it is desired to secure by United States Letters Patent is:—

1. A power unit embodying a tractor, comprising front and rear axles and propulsion mechanism carried thereby, a deck over said mechanism, and a three-point mounting completely supporting the deck on the tractor axles independently of said mechanism.

2. A power unit embodying a tractor having a pair of traction wheels provided with an axle housing and a front axle, road wheels connected to said front axle, propulsion mechanism for the tractor mounted on said axles, a deck above said mechanism, means rigidly connecting the deck to the traction wheel axle housing adjacent the traction wheels, and means pivotally connecting the deck to the front axle centrally thereof.

3. A power windlass embodying a driving shaft having a clutch member, a drum loosely mounted on the shaft, said drum having an opposing clutch member and a brake face, means for shifting the drum to bring the clutch members into engagement, a frame carrying said shaft and providing a deck, a tractor having propulsion mechanism, means mounting said frame on the tractor independently of said mechanism, there being transmission connection from said mechanism for operating said windlass, there being a control station on said deck, a clutch lever at said station, and a foot lever directly pivoted in said frame at said station and swingable in operation against said brake face.

4. A power windlass embodying a pair of drums, and a third intermediate higher drum equi-distant from each of the other drums, a power line from the intermediate drum extensible laterally in either direction clearing the drum of the pair of drums on the side to which said line extends, said pair of drums each having a power line extending away from the intermediate drum, a shaft for each drum, a clutch member for each shaft, each drum having an opposing clutch member, a lever for each drum having an arm swingable axially of the drum for shifting its drum to bring its clutch members into engagement, a bar near the remote end of the drums as to said levers, and a spring from each lever to said bar normally holding its lever in position to keep its clutch members disengaged, whereby said power lines may be selectively independently or simultaneously operable and clear of interference with each other.

5. A power windlass embodying three drums, shafts on which said drums are loosely mounted, bearings mounting the drums in parallel relation, intermeshing gearing on said shafts, a frame mounting the bearings, and adjustable bracing means directly between said bearings of different drums independently of said frame coacting for maintaining parallel alignment between said shafts and holding said gearing against meshing relation disturbance.

6. A power unit embodying a tractor comprising a motor, a deck over the tractor motor, a windlass on said deck mounted independently of said motor, power connections from the tractor motor to said windlass, there being an operator's station on said deck, and control means for the motor and windlass from said station.

7. A power unit embodying a tractor comprising a motor, a deck over the tractor motor, a windlass on said deck embodying a plurality of drums, means mounting said drums for independent rotation, speed reduction connections from the tractor motor to said windlass, and a control from the deck for said connections and motor.

8. A power unit embodying a tractor comprising a motor, a deck over the tractor motor, a windlass on said deck embodying a plurality of drums, means mounting said drums for independent rotation, driving connections from the tractor motor to said windlass, an operator's station, and control means for the windlass and tractor at said station.

In witness whereof I affix my signature.

JOSHUA WEST.